United States Patent
Smith et al.

(10) Patent No.: US 9,264,906 B2
(45) Date of Patent: *Feb. 16, 2016

(54) VOICE RECOGNITION FOR PERFORMING AUTHENTICATION AND COMPLETING TRANSACTIONS IN A SYSTEMS INTERFACE TO LEGACY SYSTEMS

(71) Applicant: AT&T Intellectual Property I, L.P., Atlanta, GA (US)

(72) Inventors: Steven G. Smith, Roswell, GA (US); Ralph J. Mills, Merritt Island, FL (US); Roland T. Morton, Jr., Lake Charles, LA (US); Mitchell E. Davis, Palmetto, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,306

(22) Filed: Apr. 22, 2015

(65) Prior Publication Data

US 2015/0230095 A1    Aug. 13, 2015

Related U.S. Application Data

(63) Continuation of application No. 14/480,219, filed on Sep. 8, 2014, now Pat. No. 9,031,846, which is a continuation of application No. 09/892,665, filed on Jun. 28, 2001, now Pat. No. 8,831,949.

(51) Int. Cl.
*H04W 12/08* (2009.01)
*G06F 21/32* (2013.01)
(Continued)

(52) U.S. Cl.
CPC ............. *H04W 12/08* (2013.01); *G06F 21/32* (2013.01); *G10L 17/005* (2013.01); *G10L 17/22* (2013.01);
(Continued)

(58) Field of Classification Search
CPC ...... H04W 12/06; H04W 12/08; G10L 15/26; G10L 17/005; G10L 17/22; G06F 21/32; H04L 67/2819; H04L 63/107; H04L 63/083
See application file for complete search history.

(56) References Cited

U.S. PATENT DOCUMENTS

| 4,776,016 A | 10/1988 | Hansen |
| 4,905,163 A | 2/1990 | Garber |

(Continued)

FOREIGN PATENT DOCUMENTS

| EP | 0712227 | 5/1996 |
| EP | 0732850 | 9/1996 |
| JP | 2000112746 A | 4/2000 |

OTHER PUBLICATIONS

Dragon Systems Inc.: Dragon Naturally Speaking Preferred Edition (www.zdnet.com/pcmag/features/speech/rev1.html), Apr. 2001.
(Continued)

*Primary Examiner* — Angela A Armstrong
(74) *Attorney, Agent, or Firm* — Gardner Groff Greenwald & Villanueva, PC

(57) ABSTRACT

A user is provided with access to a systems interface to back-end legacy systems using voice inputs. The user dials-in to the voice server using an access device. A voice recognition server performs voice authentication, speech recognition, and speech synthesis. The voice server authenticates the user based on a voice exemplar provided by the user. Using speech synthesis, the voice server provides a menu of operations from which the user can select. By speaking into the access device, the user selects an operation and provides any additional data needed for the operation. Using speech recognition, the voice server prepares a user request based on the spoken user input. The user request is forwarded to the systems interface to the legacy systems. The systems interface includes a protocol server for providing a protocol interface and a transaction server for receiving user requests and generating legacy transactions. The systems interface retrieves information from the legacy systems based on the user request and forwards this information to the voice server. The voice server formats the information and outputs the information to the access device as speech and/or text.

9 Claims, 6 Drawing Sheets

(51) Int. Cl.
*G10L 17/22* (2013.01)
*H04L 29/08* (2006.01)
*H04W 12/06* (2009.01)
*G10L 17/00* (2013.01)
*H04L 29/06* (2006.01)

(52) U.S. Cl.
CPC .......... *H04L 63/0861* (2013.01); *H04L 63/107* (2013.01); *H04L 67/2819* (2013.01); *H04W 12/06* (2013.01); *H04L 63/083* (2013.01)

(56) References Cited

U.S. PATENT DOCUMENTS

| | | | |
|---|---|---|---|
| 5,038,283 A | 8/1991 | Caveney |
| 5,359,649 A | 10/1994 | Rosu et al. |
| 5,521,958 A | 5/1996 | Selig et al. |
| 5,570,283 A | 10/1996 | Shoolery et al. |
| 5,583,937 A | 12/1996 | Ullrich |
| 5,623,404 A | 4/1997 | Collins et al. |
| 5,664,110 A | 9/1997 | Green |
| 5,687,212 A | 11/1997 | Kinser, Jr. et al. |
| 5,694,323 A | 12/1997 | Koropitzer |
| 5,696,906 A | 12/1997 | Peters |
| 5,754,830 A | 5/1998 | Butts |
| 5,799,279 A | 8/1998 | Gould |
| 5,805,775 A | 9/1998 | Eberman |
| 5,812,977 A | 9/1998 | Douglas |
| 5,826,270 A | 10/1998 | Rutkowski |
| 5,848,403 A | 12/1998 | Gabriner et al. |
| 5,857,201 A | 1/1999 | Wright et al. |
| 5,873,070 A | 2/1999 | Bunte |
| 5,884,262 A | 3/1999 | Wise |
| 5,884,266 A | 3/1999 | Dvorak |
| 5,896,440 A | 4/1999 | Reed et al. |
| 5,909,492 A | 6/1999 | Payne |
| 5,915,001 A | 6/1999 | Uppaluru |
| 5,920,846 A | 7/1999 | Storch et al. |
| 5,923,735 A | 7/1999 | Swartz |
| 5,931,917 A | 8/1999 | Nguyen et al. |
| 5,953,389 A | 9/1999 | Pruett |
| 5,960,411 A | 9/1999 | Hartman et al. |
| 5,963,940 A | 10/1999 | Liddy |
| 5,970,472 A | 10/1999 | Allsop |
| 5,974,135 A | 10/1999 | Breneman |
| 6,023,683 A | 2/2000 | Johnson et al. |
| 6,023,684 A | 2/2000 | Pearson |
| 6,026,379 A | 2/2000 | Haller et al. |
| 6,035,285 A | 3/2000 | Schlect |
| 6,052,785 A | 4/2000 | Lin |
| 6,058,373 A | 5/2000 | Blinn |
| 6,080,202 A | 6/2000 | Strickland et al. |
| 6,081,789 A | 6/2000 | Purcell et al. |
| 6,092,192 A | 7/2000 | Kanevsky et al. |
| 6,101,472 A | 8/2000 | Giangarra |
| 6,101,510 A | 8/2000 | Stone |
| 6,115,040 A | 9/2000 | Bladow |
| 6,115,737 A | 9/2000 | Ely |
| 6,223,541 B1 | 5/2001 | Farrag |
| 6,226,623 B1 | 5/2001 | Schein |
| 6,233,541 B1 | 5/2001 | Butts et al. |
| 6,311,178 B1 | 10/2001 | Bi |
| 6,324,522 B2 | 11/2001 | Peterson et al. |
| 6,341,271 B1 | 1/2002 | Salvo et al. |
| 6,366,829 B1 | 4/2002 | Wallace et al. |
| 6,389,337 B1 | 5/2002 | Kolls |
| 6,396,833 B1 | 5/2002 | Zhang |
| 6,445,774 B1 | 9/2002 | Kidder |
| 6,473,407 B1 | 10/2002 | Ditmer |
| 6,487,278 B1 | 11/2002 | Skladman |
| 6,539,548 B1 | 3/2003 | Hendricks |
| 6,578,005 B1 | 6/2003 | Lesaint et al. |
| 6,587,822 B2 | 7/2003 | Brown |
| 6,587,851 B1 | 7/2003 | Ditcharo |
| 6,598,167 B2 | 7/2003 | Devine |
| 6,606,744 B1 | 8/2003 | Mikurak |
| 6,636,831 B1 | 10/2003 | Profit et al. |
| 6,671,824 B1 | 12/2003 | Hyland |
| 6,724,406 B1 | 4/2004 | Kelley |
| 6,736,376 B1 | 5/2004 | Delisle |
| 6,738,815 B1 | 5/2004 | Willis et al. |
| 6,763,376 B1 | 7/2004 | Devine |
| 6,971,072 B1 | 11/2005 | Stein |
| 7,111,243 B1 | 9/2006 | Ballard |
| 7,149,702 B1 | 12/2006 | Smith |
| 7,219,137 B1 | 5/2007 | Smith |
| 7,286,994 B1 | 10/2007 | Dennis et al. |
| 7,401,144 B1 | 7/2008 | Smith |
| 7,606,712 B1 | 10/2009 | Smith et al. |
| 7,660,754 B1 | 2/2010 | Willis et al. |
| 8,831,949 B1 * | 9/2014 | Smith et al. ............... 704/270 |
| 9,031,846 B2 * | 5/2015 | Smith et al. ............... 704/270 |
| 2001/0016819 A1 | 8/2001 | Kolls |
| 2002/0099642 A1 | 7/2002 | Schwankl |
| 2002/0103906 A1 | 8/2002 | Knight |
| 2002/0116282 A1 | 8/2002 | Martin et al. |
| 2002/0138656 A1 | 9/2002 | Hickey |
| 2003/0006913 A1 | 1/2003 | Joyce et al. |
| 2003/0008661 A1 | 1/2003 | Joyce et al. |
| 2003/0023601 A1 | 1/2003 | Fortier |
| 2003/0046397 A1 | 3/2003 | Trace |
| 2003/0125956 A1 | 7/2003 | Lewis |
| 2003/0139932 A1 | 7/2003 | Shao et al. |
| 2004/0014479 A1 | 1/2004 | Milman |
| 2004/0209602 A1 | 10/2004 | Joyce et al. |

OTHER PUBLICATIONS

Nuance Verifier 2.0 (www.nuancecom.com/products/verifier.html), Apr. 2001.
Nuance Vocalizer (www.nuancecom.com/products/vocalizer.html), Apr. 2001.
Nuance 7.0 (www.nuancecom.com/products/nuance7.html), Apr. 2001.
Nuance (www.nuancecom.com), Apr. 2001.
Nuance Powers the Voice Web (www.nuancecom.com/partners/voiceweb.html), Apr. 2001.
Nuance Product Offering (www.nuancecom.com/products/products.html), Apr. 2001.
Nuance Voyager (www.nuancecom.com/products/voyager.html), Apr. 2001.
Nuance Solutions (www.nuancecom.com/solutions/solutions.html), Apr. 2001.
Nuance Enterprise Solutions (www.nuancecom.com/solutions/enterprise.html), Apr. 2001.
Nuance Telecom Solutions (www.nuancecom.com/solutions/telecom.html), Apr. 2001.
Nuance Internet Solutions (www.nuancecom.com/solutions/internet.html), Apr. 2001.
Nuance Services (www.nuancecom.com/services/services.html), Apr. 2001.
Nuance Speech Application Design and Development (www.nuancecom.com/services/speech_application_design.html), Apr. 2001.
Moran, "Multimodel User Interfaces in the Open Agent Architecture", 1997, ACM 0-89191-839-8, Apr. 2001.
Conversay, "Distributed Voice Processing: A more versatile approach to speech enabling wireless devices", Apr. 2001.
Delivering Speech Technologies with Fonix FAASTR Framework, Part 1, (a white paper), Feb. 2001.
Derfler et al., "How Networks Work", Seventh Ed., Que Corp, 2000.
White, Ron, "How Computers Work", Ninth Ed., Que Corp, 1999.
Preston, Gralla, "How the Internet Works", Eigth Ed., Que Corp, 1999.
"Return on Investment Model", web.archive.erg webpage of Norand.com, Feb. 6, 1998, pp. 1-5.
"Norand-Payback", web.archive.erg webpage of Norand.com, Feb. 6, 1998, pp. 1-2.
"Norand-Products", web.archive.erg webpage of Norand.com, Feb. 6, 1998, pp. 1-5.

(56) References Cited

OTHER PUBLICATIONS

"Norand-Case Study", web.archive.erg webpage of Norand.com, Feb. 1998, pp. 1-3.
Haugen, Dyan L.; Hill, Arthur V; "Scheduling to Improve Field Service Quality", Summer 1999, Decision Sciences, 30, 3: ABI/INFORM Global, pp. 783-804.
Freedman, David H; "Case Study: Gas Attack", Aug. 25, 1997, Forbes ASAP Supplement, pp. 45-52, Dialog 0148554801-36536.
McCarthy, Vince, "The Transformation of the Public Network", Mar. 20, 1995, Telephone, v228n12, pp. 88-100, Dialong 0100552196-54914.
Paz, Noemi M; Leigh, William; "Maintenance scheduling: Issues, results and research needs", 1994, International Journal of Operations & Production Management, v14n8, pp. 47-69, Dialog 00956565 96-05958.
Tseng, Paul C; Lewis, Malcom; "Best Practices and Design Tips", Apr. 1999, Contracting Business, v56, n4, p. 2s84 (1 ), Dialog 06305741 54514903.
Jewett, Dale,; "Service Call", Jul. 21, 1997, Automotive News, p. 61, Dialog 05140584 47847132.
Southerland, Randy; "Not your typical garbageman", Feb. 2000, Waste Age, 31, 2, ss50, Dialog 119704 77 60110303.
"The Luxury Class Database", Apr. 3, 1995, InformationWeek, n 521, p. 100+, Dialong 00593604 23168942.
Ivey, Mike; "Cub: Toughen Penalties vs. Ameritech", Sep. 7, 2000, Madison Captial Times, Madison, Wisconsin, p. 1 E, ProQuest ID 59714682.
Jaffe, Charles; "Gas Supplier takes timing seriously if delivers are late, the product is free". Feb. 5, 1989. The Morning Call, Allentown, PA, p. D.01, ProQuest ID 92485879.
Lister, Karen; "Improvements cited in Portland cable service", Jul. 21, 1995, Corpus Christi Caller Times, Corpus Christi, TX., Sec. B, p. 2, ProQuest 6892257.
"Norand-Field Service", web.archive.erg webpage of Norand.com., Feb. 6, 1998, pp. 1-2.
"Norand-Training", web.archive.erg webpage of Norand.com., Feb. 6, 1998, pp. 1-2.
Wood, Michael; "Fighting the paperwork nemesis", Mar. 1996, American Gas, v78n2, pp. 32-33, Dialog 01179245 98-28640.
"Powering better customer service. (Boston Edison implements mobile computing solution)", May 1997, Communication News, v34, 5n, p. 50(2) Dialog 02070908 19414033.
Kosseff, Jeffrey; "Service Delays May Lead to AT&T Fine", Jul. 18, 2001, The Oregonian, Portland, OR., p. C.01. ProQuest ID 75527844.
Office Action dated Apr. 20, 2005; U.S. Appl. No. 09/892,664, filed Jun. 28, 2001.
Office Action dated Mar. 29, 2006; U.S. Appl. No. 09/892,664, filed Jun. 28, 2001.
Office Action dated Jun. 27, 2007; U.S. Appl. No. 09/892,664, filed Jun. 28, 2001.
Office Action dated Oct. 17, 2007; U.S. Appl. No. 09/892,664, filed Jun. 28, 2001.
Office Action dated Mar. 17, 2004; U.S. Appl. No. 09/892,664, filed Jun. 28, 2001.
Office Action dated Oct. 6, 2005; U.S. Appl. No. 09/892,664, filed Jun. 28, 2001.
Office Action dated Aug. 7, 2006; U.S. Appl. No. 09/892,664, filed Jun. 28, 2001.
Office Action dated Apr. 9, 2007; U.S. Appl. No. 09/892,664, filed Jun. 28, 2001.
Office Action dated Jan. 25, 2008; U.S. Appl. No. 09/892,664, filed Jun. 28, 2001.
Office Action dated Jul. 24, 2008; U.S. Appl. No. 09/892,664, filed Jun. 28, 2001.
Office Action dated Jan. 6, 2009; U.S. Appl. No. 09/892,664, filed Jun. 28, 2001.
No author; FieldCentrlx Selects BellSouth's Intelligent Wireless Network to Bring Wireless Data Solution to Field Service Companies, Aug. 24, 1999; BusinessWlre; Dialog copy pp. 1-2.
Commercial Speech Recognition (www.tiac.net/users/rwilcox/speech.html), Apr. 2001.
IBM Voice Systems (www-4.ibm.com/software/speech), Apr. 2001.
IBM Voice Systems (www-4.ibm.com/software/speech/enterprise), Apr. 2001.
IBM Voice Systems (www-4.ibm.com/software/speech/enterprise/ms_0.html), Apr. 2001.
Metroplex Voice Computing, Inc. (www.metroplexvoice.com), Apr. 2001.
Metroplex Voice Computing, Inc. (www.metroplexvoice.com/news.htm), Apr. 2001.
Metroplex Voice Computing, Inc. (www.metroplexvoice.com/products.htm), Apr. 2001.
Metroplex Voice Computing, Inc. (www.metroplexvoice.com/medical_speech_recognition.htm), Apr. 2001.
Voice Recognition Systems Home Page (www.iglou.com/vrsky/rightframe.htm), Apr. 2001.
Lernout & Hauspie (www.lhsl.com/default2.htm), Apr. 2001.
Lernout & Hauspie, "The Language of Business" (www.lhsl.com/business), Apr. 2001.
Lernout & Hauspie, "Voice Xpress" (www.lhsl.com/voicexpress), Apr. 2001.
TMA Associates (www.tmaa.com), Apr. 2001.
TMA Associates, Editor's Notes (May 2000) (www.tmaa.com/voice_web.htm), Apr. 2001.
Fonix (www.fonix.com), Apr. 2001.

\* cited by examiner

VOICE RECOGNITION FOR PERFORMING AUTHENTICATION AND COMPLETING TRANSACTIONS IN A SYSTEMS INTERFACE TO LEGACY SYSTEMS

CROSS REFERENCE TO RELATED APPLICATIONS

This application is a continuation application of U.S. application Ser. No. 14/480,219, filed on Sep. 8, 2014, which is a continuation of U.S. application Ser. No. 09/892,665 filed Jun. 28, 2001, now U.S. Pat. No. 8,831,949, which are hereby incorporated herein by reference in their entirety for all purposes.

FIELD OF THE INVENTION

The present invention relates generally to the field of telecommunications dispatching and, more particularly, to methods and apparatus for providing user-friendly authentication and access to a systems interface to legacy systems.

BACKGROUND OF THE INVENTION

Telecommunications technicians, such as so-called "Installation and Maintenance" (I&M) technicians, may visit customer sites to install new equipment, set up new services, or to service existing equipment or services. Frequently, I&M technicians need certain information stored on back-end legacy systems to perform a job order. The legacy systems may include dispatch, facilities, and billing systems. The legacy systems may store information such as job assignment, facility assignment, network testing functions, maintenance processes, and customer-specific information.

A typical telephone company, for example, can have a number of such back-end legacy systems that I&M technicians may need to access to perform job orders. These legacy systems can include, for example, a loop facility assignment control system, a loop maintenance operations system, a computer system for main frame operations, a mechanized loop testing system, a secure network element contract server, a mechanized time reporting system, and a work activity statistical sampling plan system. Other back-end legacy and non-legacy systems may exist.

According to a previous approach, technicians could access some information from certain legacy systems using a gateway. For example, BellSouth's I&M technicians use the BellSouth Craft Access System (CAS) gateway. However, access using the gateway had significant limitations. The access was dial-up, meaning that the technician often had to tie up a customer's phone line. Additionally, logging-in and accessing data using CAS was a slow, laborious process. For example, CAS access was sometimes provided via Computer Access Terminals (CATs) using a slow 1.2 kbps connection. Because of the drawbacks of CAS, such as its slow speed, the provision of services by I&M technicians was suboptimal because of delays and impediments to getting the information necessary to complete a job order. In addition, CAS was very difficult to improve. The platform did not lend itself to creating new capabilities due to limited memory and low processor speed.

Moreover, I&M technicians often have poor or suboptimal keyboard skills. Technicians seeking information from legacy system interfaces such as CAS sometimes make mistakes in entering their requests into a computer keyboard. These mistakes can generate user errors that may result in the retrieval of incorrect information or that may result in the delayed retrieval of the correct information. Such user errors can increase the amount of time it takes I&M technicians to complete their job orders. This can increase costs and lead to customer dissatisfaction.

Furthermore, using a CAT terminal or a portable personal computer (PC) to access legacy systems can be very inconvenient to I&M technicians working in the field. A technician making a site visit already has to carry tools, supplies and other equipment to complete many job orders. Carrying an additional five to ten pounds can be very burdensome.

SUMMARY OF THE INVENTION

Accordingly, the present invention is generally directed to a system and method for permitting a user, such as a technician, to access information stored on back-end legacy systems that substantially obviates one or more of the problems due to the limitations and disadvantages of the prior art.

In an embodiment of the present invention, a user such as a technician accesses a systems interface to legacy systems via a front-end voice server. The user dials-in to the voice server using a portable access device. Preferably, the portable access device is a cellular phone. Preferably, the voice recognition server performs voice authentication, speech recognition, and speech synthesis functions. The voice server authenticates the user based on a voice exemplar provided by the user. Using speech synthesis, the voice server provides a menu of operations from which the user can select. By speaking into the access device, the user selects an operation and provides any additional data needed for the operation. Using speech recognition, the voice server prepares a user request based on the spoken user input. The user request is forwarded to the systems interface to the legacy systems. Preferably, the systems interface includes a protocol server for providing a protocol interface and a transaction server for receiving user requests and generating legacy transactions based on the user requests. The systems interface retrieves information from the legacy systems based on the user request and forwards this information to the voice server. The voice server formats the information and outputs the information to the access device. Preferably, the outputted information may be synthesized speech and/or text presented on a display of the access device.

The advantages of the present invention are numerous. The invention permits a user, such as a technician, to remotely access information from back-end legacy systems using a voice input to a systems interface instead of making entries on a keyboard. The voice input can be made over a wireline or over a wireless communications network. Using a voice input to the systems interface can reduce difficulties arising from keyboard entry errors. Using a voice input can also free up the technician to tend to other tasks. Using a voice input can reduce costs and improve customer satisfaction. Using a voice input into a cellular phone rather than a PC alleviates the technician from the burden of having to carry the PC around. In addition, other benefits include lower cost of cell phone in comparison to PCs; less maintenance on cell phone; fewer, if any, software upgrades to be concerned on the cell phone; and ease of adding new functionality because client software does not have to be developed or managed.

DETAILED DESCRIPTION OF THE INVENTION

Figure 1:
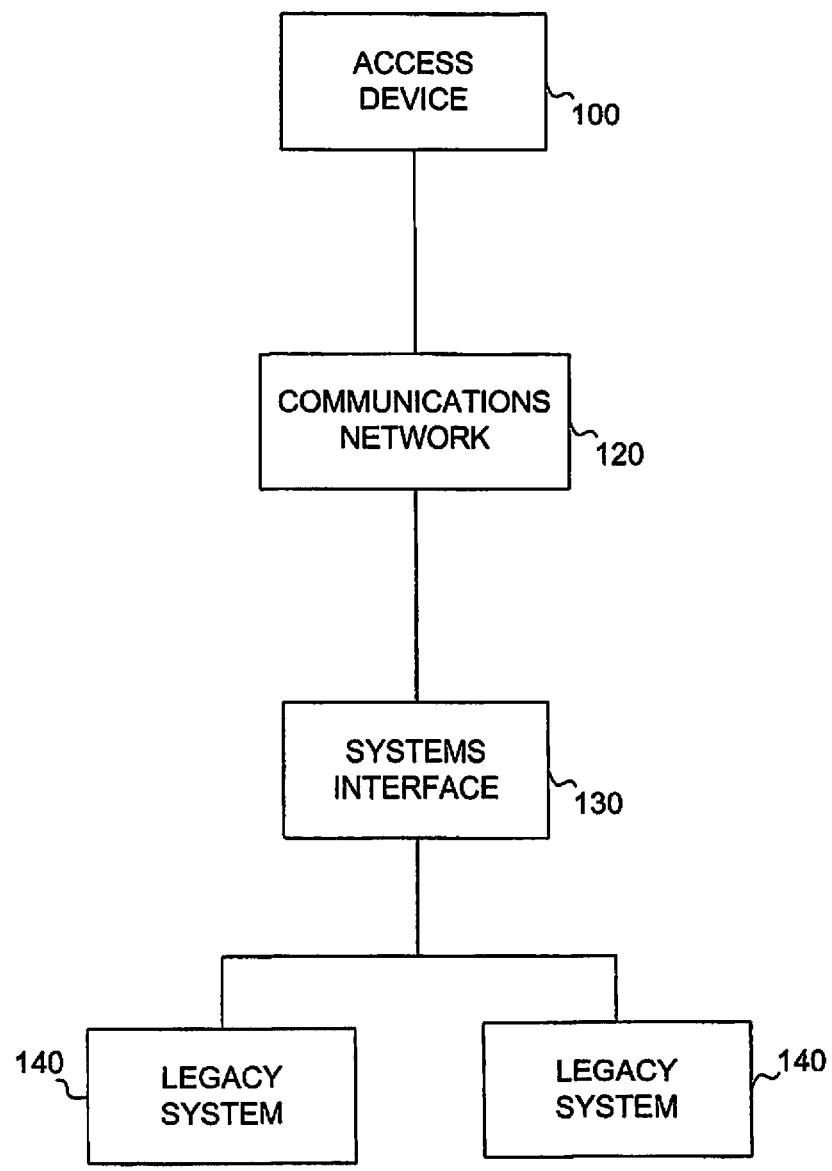
FIG. 1 is a schematic block diagram of a system for allowing users to access information from back-end legacy systems according to an embodiment of the invention.

FIG. 1 is a schematic block diagram of an exemplary system for allowing a user, such as a technician, to access information from back-end legacy systems according to an embodiment of the invention. The system of FIG. 1 includes access device 100, communications network 120, systems interface 130, and back-end legacy systems 140.

Access device 100 is a portable device capable of receiving voice input by a technician or other service person to access information from back-end legacy systems 140. Access device 100 may be a voice-capable personal computer, laptop, personal data assistant, cellular phone, two-way pager, processor, or any portable device capable of receiving voice inputs to be transmitted over a shared network. Preferably, access device 100 is a cellular phone with a display.

Access device 100 remotely accesses systems interface 130 through communications network 120. Communications network 120 may be any communications network that permits a remote computer to access a remote server. Communications network 120 could be a wireline network, wireless or cellular network, satellite network, and so forth. Preferably, communications network 120 is a wireless communications network.

Systems interface 130 provides a systems interface between portable access device 100 seeking data from back-end legacy systems 140. Legacy systems 140 are generally mainframe-type computer systems that maintain data for a company. According to an embodiment, legacy systems 140 may include one or more of the following systems: a loop facility assignment control system; a loop maintenance operations system; a computer system for main frame operations; a mechanized loop testing system; a secure network element contract server; a mechanized time reporting system; and a work activity statistical sampling plan system.

The general operation of the system of FIG. 1 is as follows. A user of access device 100, such as a technician, logs onto systems interface 130 over communications network 120. After the log-on, systems interface 130 permits access device 100 to make requests for information from legacy systems 140. The user can make the requests by voice inputs to systems interface 130. After receiving the voice inputs, systems interface 130 processes the inputs to generate user requests, generates legacy transactions based on the user requests, receives information from legacy systems 140, and transmits the information back to access device 100. Preferably, the information transmitted to access device 100 is voice data to be outputted by a speaker at access device 100 and/or text data to be presented on a display at access device 100.

Figure 2:
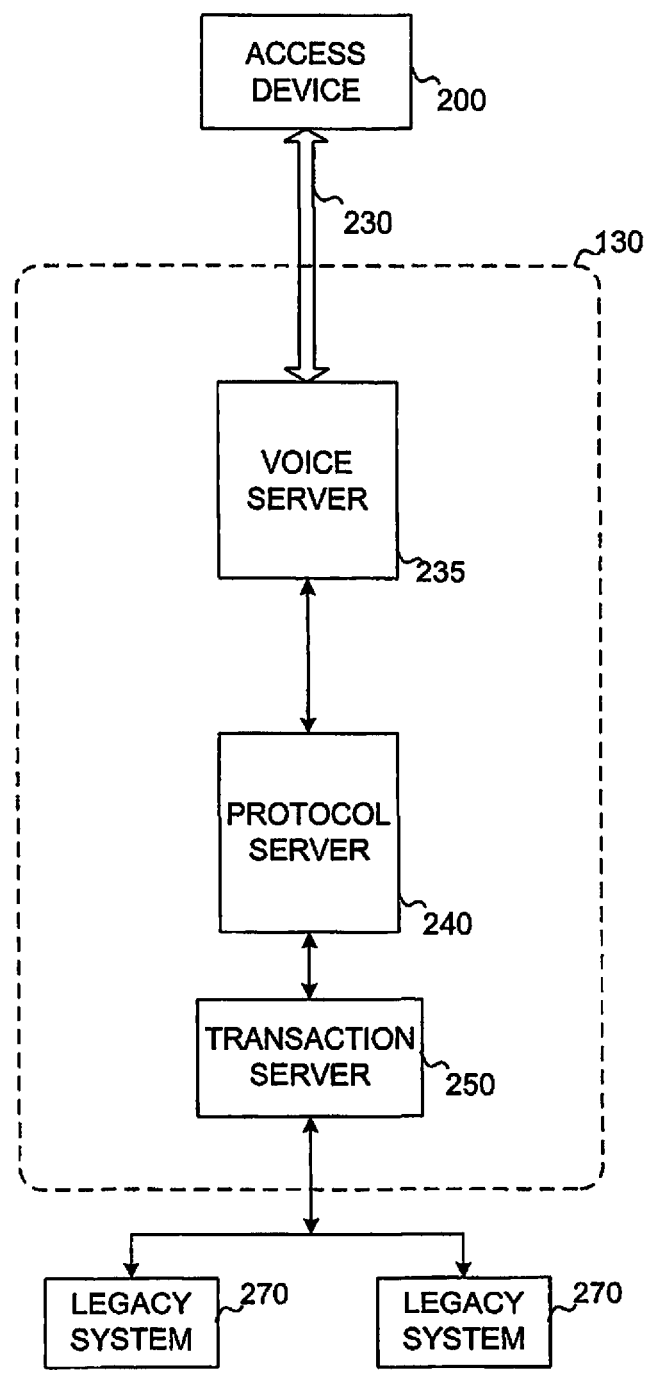
FIG. 2 is a schematic block diagram of a system for allowing users to access information from back-end legacy systems according to an embodiment of the invention.

FIG. 2 is a schematic block diagram of an exemplary preferred systems interface 130 for allowing technicians to access information from legacy systems using voice inputs according to an embodiment of the invention. The system of FIG. 2 includes access device 200, communications network 230, voice server 235, at least one protocol server 240, at least one transaction server 250, and legacy systems 270.

Access device 200 may be any of the devices discussed above for access device 100 (FIG. 1). Preferably, access device 200 is a cellular phone with a display.

Communications network 230 may be a wireline communications network, or wireless communications network. Preferably, communications network 230 is a wireless or cellular communications network. For example, communications network 230 may be the Cingular Wireless Network.

Legacy systems 270 are similar to and include any of the variations discussed in connection with legacy systems 140 of FIG. 1.

In accordance with FIG. 2, access device 200 accesses legacy systems 270 through a systems interface 130. Systems interface 130 includes voice server 235, protocol server 240, and transaction server 250.

Generally, protocol server 240 provides a protocol and middleware interface between access device 200 (through voice server 235) and transaction server 250. Protocol server 240 may receive user requests or other messages from access device 200; route requests or messages to transaction server 250; receive responsive information from transaction server 250; and route responsive information back to voice server 235 (through access device 200). Generally, transaction server 250 provides an interface to backend legacy systems 270 so that responsive information can be retrieved.

Transaction server 250 may service requests, generate legacy transactions in response to those requests, and receive responsive information to be forwarded back to protocol server 240.

The preferred protocol server 240 and transaction server 250 are disclosed in the copending, commonly owned, U.S. patent application Ser. No. 09/343,815, entitled "Systems and Methods for Utilizing a Communications Network for Providing Mobile Users Access to Legacy Systems (hereinafter, referred to as "the '815 application"), filed on Jun. 30, 1999, the entirety of which is hereby incorporated by reference. The preferred systems interface (not include the voice server) is described in the aforementioned application in connection with the disclosed "TECH NET" system.

In particular, preferred protocol servers/or servers 240 are disclosed in the '815 application as the "protocol servers," which may include any associated hardware and/or software disclosed in connection therewith. Preferred transaction servers 250 are disclosed in the '815 application as the "TechNet servers," which may include any associated hardware and/or software disclosed in connection therewith.

Voice server 235 provides an interface between access device 200 and the rest of the system so that the generally "Voice in, voice out" feature of the present invention is substantially transparent to protocol server 240 and transaction server 250. Voice server 235 also authenticates the user via a combination of voice print identification and queries to the user at login.

Regarding input, voice server 235 prepares user requests and other messages (e.g., a log-in attempt) based on voice inputs. Therefore, although requests originate as voice inputs from a conventional device, such as a cell phone, the user requests forwarded by voice server 235 have the same format as if they were prepared by a computer with specialized client software, such as the "TechNet client software" disclosed in the '815 application.

Regarding output, voice server 235 processes responsive information returned by protocol server 235 in order to provide an output appropriate for access device 200. For example, voice server 235 processes the responsive information to provide a speech output and/or text output that can be presented by the speaker or display (respectively) of a cellular phone. Voice server 235 can be programmed with a series of preformatted queries that it suggests to the user. The user selects which query or function he wishes to invoke and provides any additional information requested by voice server 235 such as a customer's telephone number. The voice server 235, after all required information is provided by the user, can then provide confirmation/acknowledgement of the data received and transmits the query on to the transaction server 250 via protocol server 240.

Voice server 235 can be a dial-in type device that can be accessed by access device 200 dialing-in over a wireline or wireless network. Preferably, voice server 235 is accessed via a dedicated number (e.g., so-called "800" or "888" number) in a wireless network. Preferably, voice server 235 can perform three main operations: voice authentication, voice recognition, and voice synthesis, discussed in greater detail below.

Voice server 235, protocol server 240 and transaction server 250 are depicted in FIG. 2 as separate servers for purposes of clarity and illustration. The operations performed by voice server 235, protocol server 240 and transaction server 250 could easily be combined and performed on a single server. On the other hand, the operations could easily be further subdivided and performed on additional servers. It should also be understood that the term "server" is intended to encompass variations such as processor, microprocessor, computer, minicomputer, microcomputer, and so forth.

The general operation of the preferred system of FIG. 2 is now described. A user, such as a technician, dials-in to voice server 235, preferably by dialing a dedicated number associated with wireless communications network 230. Voice server 235 uses synthesized speech to request a voice exemplar for log-in. The user provides a speech exemplar. Voice server 235 processes the voice exemplar to extract a voiceprint or other mathematical characterization of the user's voice. The extracted characterization is compared to a database of characterizations in order to identify the user. Based on the user's identity, the information typically required to log onto protocol server 240 (e.g., a user name and password or primary group address) is retrieved. This retrieved information is forwarded by voice server 235 to protocol server 240 to effectuate the log-on.

Following log-on, voice server 235 uses speech synthesis to provide a menu of operations from which the user can select. The user selects an operation using voice input that is interpreted using the speech recognition capability of voice server 235. Alternatively or in addition, voice server 235 could number the operations, and the user could input a selection by speaking an appropriate number on a cell phone. The user may also speak a command. For example, the user can say: "Change Cable Pair," and the system will jump to that transaction without going through the list of functions that is available to the user. Alternatively, if the user is not familiar with the system, the user can wait to hear the list provided by the system and select an appropriate operation.

After selecting an operation, the user may need to input additional information used to complete the data fields associated with the user request corresponding to that operation. For example, if the operation is "Get Client Account Information," other data such as a name, account number, phone number, and so forth must be provided. Voice server 235 may use its voice synthesis capability to provide a prompt for such additional information. For example, voice server 235 may send the following voice synthesized statement: "Please state the customer's account number" or "Please state the customer's phone number," and so forth. The user provides a voice input for this other data, which is processed using the speech recognition feature of voice server 235.

Voice server 235 formats a user request based on the voice inputs provided from access device 200. The user request is forwarded to protocol server 240 and transaction server 250, which process the request to retrieve responsive information from legacy systems 270. The responsive information is sent to voice server 235.

Voice server 235 processes the responsive information to format an output appropriate for an access device 200. Access device 200 has limitations regarding the volume of data it can present by voice output or display. Voice server 235 may take these limitations into account when formatting output. For example, voice server 235 may limit the amount of data that can be presented. If the volume of responsive information exceeds some amount, voice server 235 may output a message similar to the following: "The volume of responsive information to your request requires that you resubmit the request using your PC."

Otherwise, voice server 235 converts the responsive information into voice output or text output, or both, that is transmitted to access device 200. Voice output will be heard by the user listening to the speaker at access device 200. Text output will be read by the user viewing the display at access device 200. Preferably, the user can, for example, tell the system to "send output to digital display." Alternatively, if the user does not provide any instructions, the system can be adapted to simply speak the output to the user. In other words, the user can program so that the system can either output by voice or text, or both.

Figure 3:
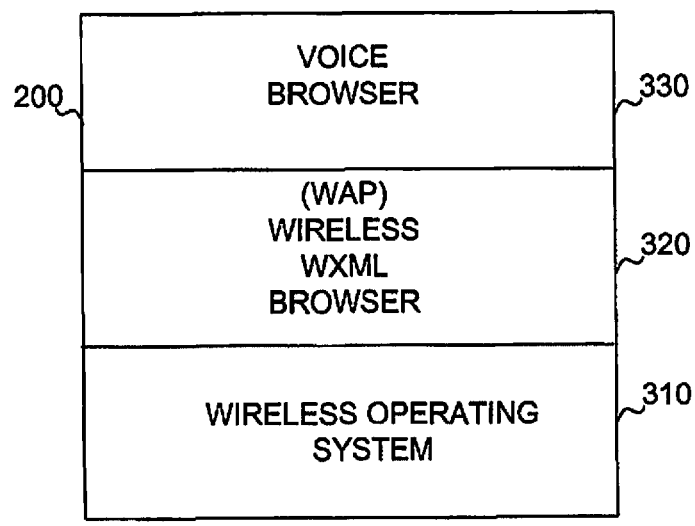
FIG. 3 is a schematic diagram of the software configuration of an access device used in accordance with an embodiment of the invention.

FIG. 3 is a schematic diagram of an exemplary software configuration of an access device 200 used in accordance with an embodiment of the invention. According to FIG. 3, access device 200 is programmed with wireless operating system 310, wireless browser 320, voice browser 330, and other software 340.

Wireless operating system 310 can be a conventional operating system for a wireless device, such as a Rim 950 or 957 interactive pager or a WAP-enabled cell phone device.

Wireless browser 320 provides an interface so that text data sent in WXML or WAP format can be interpreted and presented on the display of access device 200.

Voice browser 330 can be a commercially available voice browser, such as the Nuance Voyager product sold by Nuance Communications. Users can access Voice XML enabled websites. Some websites have recognized the market potential for cell phone access and they have created voice XML access as well as WAP access for digital devices.

Figure 4:
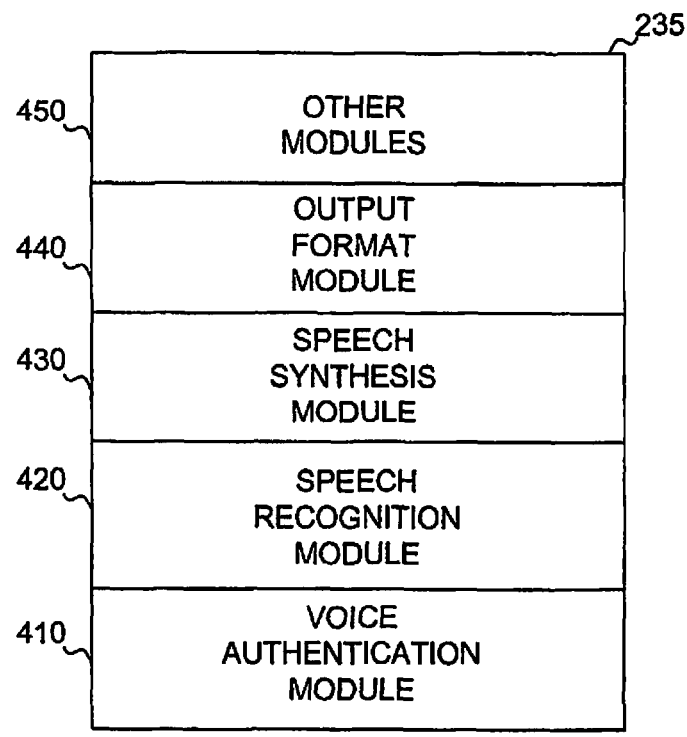
FIG. 4 is a schematic diagram of the software configuration of an exemplary voice server used in accordance with an embodiment of the invention.

FIG. 4 is a schematic diagram of an exemplary software configuration of an exemplary voice server 235 used in accordance with an embodiment of the invention. For purposes of illustration, FIG. 4 is described in connection with some of the structure of FIG. 2. However, this is only for purposes of explaining the invention, and the exemplary software configuration of FIG. 4 should not be considered to be limited by the structure of FIG. 2 or any other structure.

According to FIG. 4, voice server 235 is programmed with voice authentication module 410, speech recognition module 420, speech synthesis module 430, output format module 440, and other modules 450.

Voice authentication module 410 performs user authentication by extracting a voiceprint or like characterization of a user exemplar. Voice authentication module 410 may also look up log-on data (e.g., user ID and password) that can be forwarded to protocol server 240 (FIG. 2) so that the log-in is transparent. Voice authentication module 410 can be custom software, or it could be adapted or prepared from a commercially available product. A number of authentication software products are presently available. Preferably, voice authentication module 410 is based on the Nuance Verifier 2.0 product sold by Nuance Communications of Menlo Park, Calif.

Speech recognition module 420 performs speech recognition by processing voice input from the user of access device 200 (FIG. 2). Speech recognition module 420 interprets voice inputs corresponding to the selection of an operation, the input of data for data fields for the operation, and so forth.

Speech recognition module 420 uses these voice inputs to prepare user requests that are recognized by protocol server 240 (FIG. 2). Speech recognition module 420 can be custom software, or it could be adapted or prepared from a commercially available product. A number of speech recognition software products are presently available. Commercially available speech recognition applications include those sold by United Research Labs (e.g., VoiceAction), Dragon Systems (e.g., NaturallySpeaking and DragonDictate), IBM (ViaVoice, Natural Language Understanding), Lemour & Houspie (e.g., Voice Xpress), Phillips Speech Processing (e.g., FreeSpeech98), Verbex Voice Systems (e.g., Listen for Windows). Preferably, speech recognition module 420 is prepared based on the Nuance 7.0 product sold by Nuance Communications.

Speech synthesis module 430 performs speech synthesis to provide voice output to access device 200 (FIG. 2). This voice output includes prompts made to the user, such as for a log-in exemplar, for an operation selection, or for other data needed to prepare the user request. The voice output also includes the output of responsive information from legacy systems 270 (FIG. 2) based on a user request. For voice output of responsive information, speech synthesis module 480 may receive text or characters from output format module 440 that are converted to speech in a text-to-speech (TTS) operation.

Speech synthesis module 430 can be custom software, or it could be adapted or prepared from a commercially available product. A number of synthesis software products are presently available from distributors such as those listed above for speech recognition module 420. Preferably, speech synthesis module 430 is based on the Nuance Vocalizer 1.0 product sold by Nuance Communications.

Output format module 440 formats responsive information received from protocol server 240 into an output appropriate for access device 200. Output format module 440 may determine when the volume of responsive information exceeds an amount that can be outputted by access device 200 (FIG. 2). Output format module 440 may include logic that determines what information should be outputted as voice output and what should be outputted as text output. Information that is to be outputted as voice output may be passed to speech synthesis module 430 for TTS conversion. Preferably, pre-established queries on voice server 235 can limit large amounts of data from being returned to the user. For example, voice server 235 can be adapted so that queries that may result in large amounts of date are not returned via voice. An overlay digital data (TechNet) application can be used to provide the ability to get the massive amounts of data required for service order details and other data-intensive requests. Other module 450 refers to any other modules that might be used by voice server 235.

Figure 5:
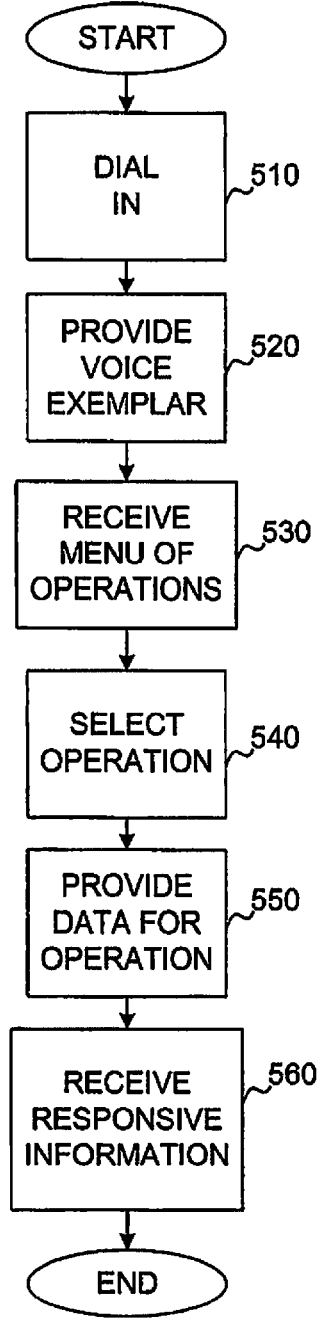
FIG. 5 is a flow diagram of a method for a user to retrieve information from a back-end legacy system using a voice input according to an embodiment of the invention.

FIG. 5 is a flow diagram of a method for a user to retrieve information from a back-end legacy system using a voice input according to an embodiment of the invention. To explain and illustrate the invention, FIG. 5 is discussed in connection with structure from FIG. 2. However, the method of FIG. 5 is not to be considered as limited to or constrained by the structure of FIG. 2 or any other structure.

In step 510 the user dials into a voice server at the front-end of a systems interface to legacy systems. For example, a user of access device 200 may dial-in to voice server 235 (FIG. 2).

In step 520, the user provides a voice exemplar. Alternatively, the user may state, what he wants to do. He may state, for example, "Get candidate pairs for my job" and the system will perform a candidate pair transaction. If the user does not remember the command, he can wait for the system prompts as described in 530.

In step 530, the user receives a menu of operations from which to select. For example, voice server 235 may provide a voice output of the menu to access device 200.

In step 540, the user selects an operation. For example, the user may provide a voice input corresponding to one of the operations from the menu.

In step 550, the user provides other data for the operation. For example, the user may provide data such as a customer name, account number, or other data that is needed for the user request.

In step 560, the user receives the responsive information. For example, the user may receive the responsive information as a synthesized voice output from a speaker at access device 200. For example, the user may receive the responsive information as text output presented by a display at access device 200.

Figure 6:
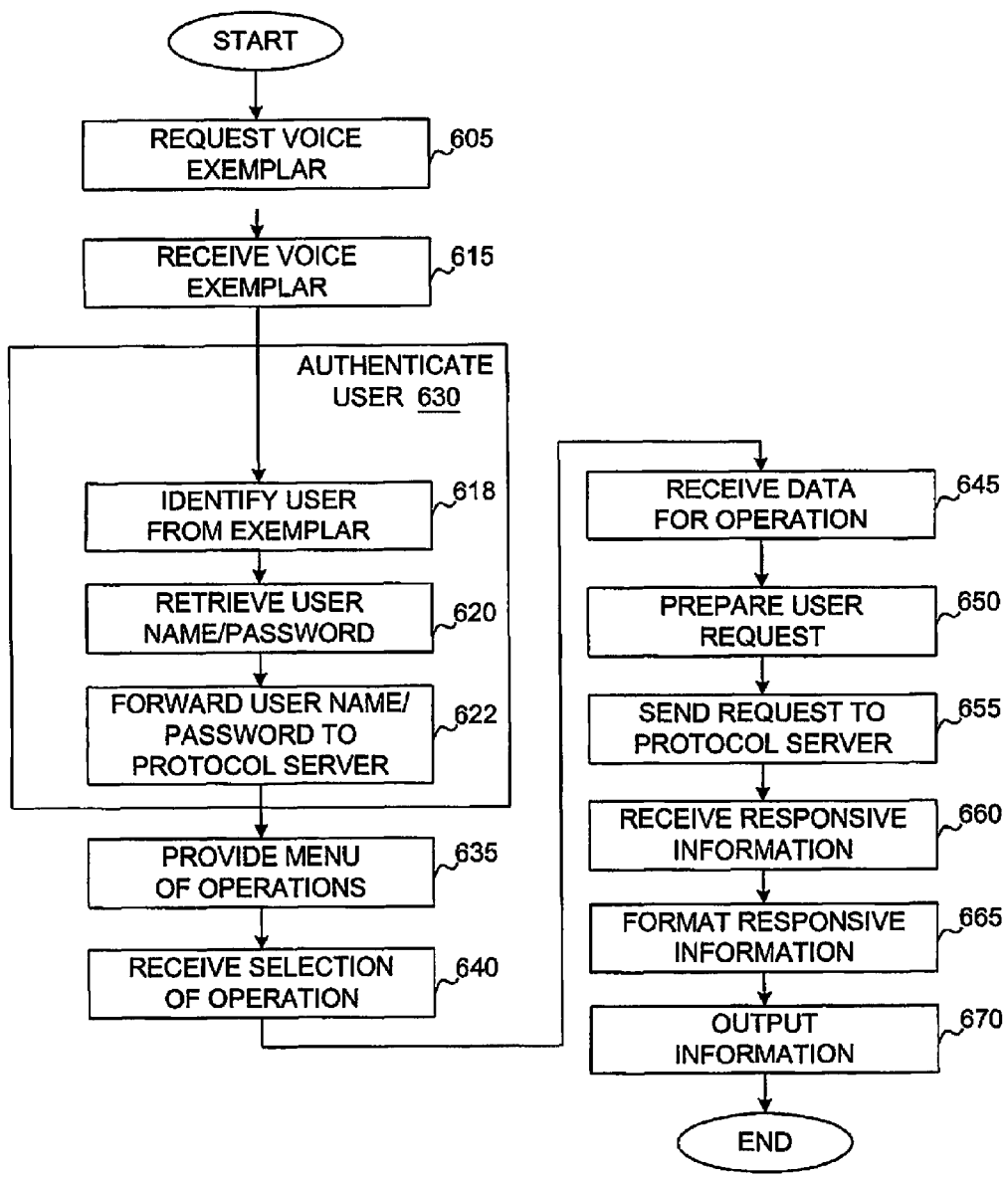
FIG. 6 is a flow diagram of a method for allowing a user to retrieve information from a back-end legacy system using a voice input according to an embodiment of the invention.

FIG. 6 is a flow diagram of a method for allowing a user to retrieve information from a backend legacy system using a voice input according to an embodiment of the invention. To explain and illustrate the invention, FIG. 6 is discussed in connection with structure from FIG. 2. However, the method of FIG. 6 is not to be considered as limited to or constrained by the structure of FIG. 2 or any other structure.

In step 605, a request is made for a voice exemplar. For example, voice server 235 (FIG. 2) may make a voice synthesized prompt to the user of access device 200 (FIG. 2).

In step 615, a voice exemplar is received. For example, voice server 235 (FIG. 2) may receive a voice exemplar based on a voice input by the user of access device 200 (FIG. 2).

In step 630, the user is authenticated for the log-in. According to an embodiment, the step of authenticating the user may include steps 618-622. In step 618, the user is identified from the received voice exemplar. For example, voice server 235 (FIG. 2) may process the received voice exemplar to generate a voiceprint that is compared to a database of voiceprints to identify the user. In step 620, a user name and password (or similar code) is retrieved for the identified user. In step 622, the user name and password (or similar code) is forwarded to the protocol server. For example, the user name and password (or similar code) may be forwarded to protocol server 240 to complete the log-in in a transparent manner.

In step 635, a menu of operations is provided. The menu may be provided as previously discussed.

In step 640, a selected operation is received. For example, voice server 235 (FIG. 2) may receive a voice input selection from the user of access device 200 (FIG. 2).

In step 645, other data needed for the operation is received. For example, voice server 235 (FIG. 2) may receive additional voice inputs used to complete data fields corresponding to the user request.

In step 650, a user request corresponding to the voice inputs for steps 640 and 645 is prepared.

In step 655, the user request is sent to the protocol server (e.g., protocol server 240 of FIG. 2).

In step 660, the responsive information corresponding to the user request is received. For example, protocol server 240 may forward responsive information that was based on a legacy transaction generated by transaction server 250 that was run against legacy systems 270.

In step 665, the responsive information is formatted. For example, voice server 235 may format the responsive information for appropriate output to access device 200 as synthesized voice or text.

Finally, in step 670, the information is output to the access device.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed:

1. A voice server, comprising a processor configured to perform operations including:

authenticating a user based on a voice exemplar received by the voice server, wherein the voice server is in direct communication with an access device associated with the user;

receiving voice inputs from the access device, converting the voice inputs into a user request, and sending the user request to a protocol server among a plurality of protocol servers, wherein each of the protocol servers is configured to communicate with a transaction server which is in direct communication with a plurality of legacy systems, the transaction server is configured to receive the user request and provide responsive information from the plurality of legacy systems based on the user request, each of the protocol servers includes an application programming interface server, and the transaction server includes an application programming interface client configured to communicate with each application programming interface server, providing a menu of operations associated with the plurality of legacy systems to the access device; and receiving the responsive information and formatting the responsive information into an output for the access device, including choosing from among a plurality of output formats comprising speech synthesized data and text data, wherein if the user request is a data-intensive request, the responsive information is not output via speech synthesized data, and wherein the data-intensive request comprises a request for service order details to be retrieved from the plurality of legacy systems.

2. The voice server of claim 1, wherein the voice inputs include a selection of an option and data for that option.

3. The voice server of claim 1, wherein the processor is further configured to provide a speech synthesized prompt to the access device.

4. The voice server of claim 3, wherein the prompt requests that the user select an operation associated with the plurality of legacy systems.

5. The voice server of claim 1, wherein the processor is further configured to convert text to speech.

6. The voice server of claim 1, wherein the responsive information is received from a protocol server.

7. The voice server of claim 5, wherein the responsive information received from the protocol server is forwarded from the transaction server.

8. The voice server of claim 6, wherein the responsive information is based on a legacy transaction generated by the transaction server.

9. The voice server of claim 1, wherein the processor is further configured to determine whether a volume of responsive information exceeds an amount that can be output by the access device.

* * * * *